US008688820B1

(12) United States Patent
Bhogi et al.

(10) Patent No.: US 8,688,820 B1
(45) Date of Patent: Apr. 1, 2014

(54) METHODS AND APPARATUS FOR REMOTE MANAGEMENT AND SELF MANAGEMENT OF SERVERS

(75) Inventors: Sankara Rao Bhogi, Bangalore (IN); Pankaj Jairath, New Delhi (IN); Shalini Muthukrishnan, Bangalore (IN); Hemanth Puttaswamy, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 2160 days.

(21) Appl. No.: 11/169,234

(22) Filed: Jun. 28, 2005

Related U.S. Application Data

(60) Provisional application No. 60/583,574, filed on Jun. 28, 2004.

(51) Int. Cl.
*G06F 15/16* (2006.01)
*G06F 15/177* (2006.01)
*G06F 15/173* (2006.01)
*G06F 3/00* (2006.01)

(52) U.S. Cl.
USPC ........... 709/224; 709/217; 709/221; 709/223; 709/246; 709/218; 719/318

(58) Field of Classification Search
USPC ......... 709/223, 224, 217, 218, 219, 220, 221, 709/246
See application file for complete search history.

(56) References Cited

U.S. PATENT DOCUMENTS

| 5,809,235 | A | * | 9/1998 | Sharma et al. | 709/230 |
|---|---|---|---|---|---|
| 6,347,330 | B1 | * | 2/2002 | Dawson et al. | 709/203 |
| 7,010,586 | B1 | * | 3/2006 | Allavarpu et al. | 709/223 |
| 2002/0152302 | A1 | * | 10/2002 | Motoyama et al. | 709/224 |
| 2003/0041139 | A1 | * | 2/2003 | Beadles et al. | 709/223 |
| 2003/0069950 | A1 | * | 4/2003 | Gieseke | 709/221 |
| 2004/0098478 | A1 | * | 5/2004 | Koetke et al. | 709/224 |

* cited by examiner

*Primary Examiner* — Ranodhi Serrao
*Assistant Examiner* — Farrukh Hussain
(74) *Attorney, Agent, or Firm* — Brooks Kushman P.C.

(57) ABSTRACT

A system receives a management configuration set defining at least one event to be detected in the application server, and a respective associated action to be taken upon detection of the events. For each of the events to be detected in the application server, the system instantiates an event class to detect the event. For each of the actions to be taken upon detection of the event by the event class, the system instantiates a respective action class to perform that action on behalf of the event class that detects the event. The system operates the instantiated event classes to detect events and to send an event notification to each of the respective action class associated with that event.

19 Claims, 5 Drawing Sheets

METHODS AND APPARATUS FOR REMOTE MANAGEMENT AND SELF MANAGEMENT OF SERVERS

RELATED APPLICATIONS

This application is a Utility of U.S. Provisional Application Ser. No. 60/583,574 entitled "METHODS AND APPARATUS PROVIDING A DECLARATIVE ALERT MODEL" filed Jun. 28, 2004, the entire teachings of which are hereby incorporated by reference.

BACKGROUND

Conventional technologies for managing, configuring, and tuning servers within a network provide system administrators with conventional tools to perform these tasks. System administrators can log into individual servers, either directly or remotely, and perform tasks such as writing a software utility that executes an email alert in response to certain events (i.e. if more than "X" processes are running on the server, send an email to a certain system administrator, or to a list of system administrators), configuring the server (i.e. configuring database connections), or detecting and correcting memory problems (i.e. 'out of memory" or memory leaks). Utilities exist to make these tasks relatively simple for a system administrator to manage, and system administrators can also write software utilities that automate some of these tasks.

SUMMARY

Conventional technologies for managing system administrative tasks suffer from a variety of deficiencies. In particular, conventional technologies that manage system administrative tasks are limited in that they require a system administrator to perform the tasks on a server-by-server basis. In a complex network that might contain many hundred or servers, conventional techniques for remote configuration of event management and administration of servers suffers in that such conventional techniques require the administrator to log into and configure event management within each individual server. This can be a time consuming and labor intensive task and can be prone to human error. For example, if an administrator desires to configure all servers in a server farm to provide email notification in response to a set of specific events, the administrator is required to write a script to detect the event and to provide email notification in response to the event. This script must then be manually uploaded to each server that is to be quipped with such functionality. The script must then be manually started (i.e. executed) on each server. If the administrator then desires to change the types of events that are to be detected by the script, or desires to change a recipient of the email that is sent upon detection of an event, the script must be manually modified within each server. Using conventional techniques, this remote administration is very cumbersome. This is a need in the art then for a remote event management framework that provides significant automation in the area of event management and resultant action invocation for servers in a distributed network environment.

Embodiments disclosed herein significantly overcome such deficiencies and provide a system that includes a computer system executing a remote management process for an application server. The remote management process allows a system administrator to automate system administration tasks such as event management and reporting without having to write specific software utilities and without requiring the administrator to manually log into each server to reconfigure event management. The remote management process disclosed herein also allows individual application servers to self manage the necessary system administration tasks such as event management by detecting events and performing actions in response to those events. Each instance of an application server runs its own remote management process. The remote management process receives a management configuration set, via a graphical user interface running on a management station. The management station allows the administrator to define what events are to be detected, and what resulting actions are to be performed by each server in response to detection of the specified events. Once this event management configuration set containing event and resultant action data is obtained (e.g. via a graphical user interface), the management station disseminates the management configuration set(s) to each instance of the application servers. Each management configuration set consists of an event(s) to be detected, and an action(s) to be performed upon detection of the event(s). A framework operates in each server to receive the management configuration set and install event detection mechanism and resultant action implementation mechanisms for the event/action data specified in the management configuration set. In one configuration, for every event to be detected, each application server instantiates an event class for the purpose of detecting the event. For each action to be taken upon detecting an event, the remote management process instantiates an action class to perform an action in response to the detection of the event.

The remote management process runs on each instance of an application server, allowing each application server to generate its own classes management framework, remotely controlling the properties by which application server event detections and notifications take place. There is no need for system administrator(s) to write software utilities such as scripts to automate these tasks, nor do the system administrator(s) need to manage individual application servers since every instance of the application servers is self-managed via the event/action framework disclosed herein. One goal of self management is to ease the problem of managing a complex IT infrastructure by creating computer systems, and software that can respond to changes in the IT (and ultimately, the business) environment, and to allow servers to configure, tune, heal and protect themselves. The Self Management initiative is to make the Application Server intelligent to:

Manage complexity by self-configuring event and action mechanisms

Improve ease-of-use by automating mundane management tasks

Improve performance by self-tuning in unpredictable runtime conditions

Improve availability by preventing and recovering (self-healing) from failures

Improve security by taking self-protective actions when security threats are detected.

During an example operation of one embodiment, suppose a system administrator wants to regulate the heap size of each application server within a group of application servers by killing (e.g. halting or lowering priority of) a number of processes on an individual application server once the heap size on that application server grows beyond a specified threshold. A user, such as a system administrator, creates the rule (i.e. the management configuration set) via a graphical user interface at a management station. The system administrator selects a "Management Rules" option within the graphical user interface to view a list of existing rules in the tree view. When a system administrator clicks a rule within the tree view, a panel shows the details related to that rule. If the system administrator wants to create a new rule, the system administrator can choose a "Create a New Rule" option from the graphical user interface, bringing up an interactive panel where the system administrator can choose options, and fill in fields related to the rule. For example, the system administrator would fill in a field specifying the name of the rule, for example, "Heap Threshold". The system administrator chooses the event that causes the rule to be invoked by choosing from a drop down list of event types. Depending on the event type chosen, a list of event properties is displayed for the chosen event, meaning different events list different event properties. Some of the event properties are multiple-choice options, while others can be data fields that need to be filled in by the system administrator, with the correct value for that field (e.g. an heap limit). For example, the system administrator specifies the threshold heap size (i.e. the event) in megabytes to define an event, that if the event occurs, causes some of the processes on that instance of application server to be killed or temporarily halted or lowered in priority (i.e. the action), by filling in a data field with the threshold heap size. The system administrator chooses the action to be performed once the rule is invoked by choosing an action object, such as a Java Mbean object. Example actions can include modifying process behavior (e.g. killing a process), emailing a recipient of the event occurrence, changing operation of the server (e.g. activating additional processors), or any other type of action. Once a rule has been created, a system administrator can modify that rule by modifying the rule name, event and/or action(s) to be performed.

The management station can disseminate the management configuration set to each server. The servers each receive the management configuration set and can instantiate an event class to detect the specified event(s) and can instantiate corresponding action class(es) to perform the specified action upon occurrence of the events detected by the event classes. At runtime, when an event class detects an event, the event class can notify the appropriate action classes to carry out the specific actions. During instantiation of the event and action classes, configuration parameters specified by the administrator (using the graphical user interface management tool) are configured into the event and action classes. For example, the graphical user interface can allow the administrator to provide an email address of one or more recipients that are to receive email notification of occurrence of an event. The graphical user interface can also allow the administrator to specify the message to be sent in the email to each recipient. This configuration data is sent to each server and upon instantiation of event and action classes, the action class for this event can be configured with the email address and message content information such that upon occurrence of an event, the appropriate email is sent to the appropriate recipients. Thus each server in a large server farm can be configured easily and remotely and no custom scripting and separate manual modifications are required.

Other embodiments of the disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein, as explained herein, may be employed in data communications devices and other computerized devices and software systems for such devices such as those manufactured by Sun Microsystems, Inc. of Santa Clara, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system that performs a remote management process for an application server. Each instance of an application server runs its own remote management process. The remote management process receives a management configuration set. The management configuration set is inputted via a graphical user interface running on a management station. Each management configuration set consists of an event (or events) to be detected, and at least one action to be performed upon detection of the event(s). The management station transmits the management configuration set(s) to each instance of the application servers by populating a configuration file that exists on each instance of an application server. A configuration listener on each server detects any changes in the configuration file, causing the remote management process to instantiate an event class. For every event to be detected, each application server instantiates an event class for the purpose of detecting that event. For each action to be taken upon detecting an event, the remote management process instantiates an action class to perform an action in response to the detection of the event. The event classes and action classes can be configured with specific parameters indicated within the management configuration set, as specified by the administrator operating the graphical user interface on the management station (i.e., as specified during creation of the management configuration set that is thereafter distributed to each server). The system disclosed herein thus provides an event and action framework for remote administration of application servers (e.g. web servers, or another other type of computer system).

Further details concerning the unique manner in which the system disclosed herein remotely manages application servers will now be provided with respect to the Figures and the discussion below.

Figure 1:
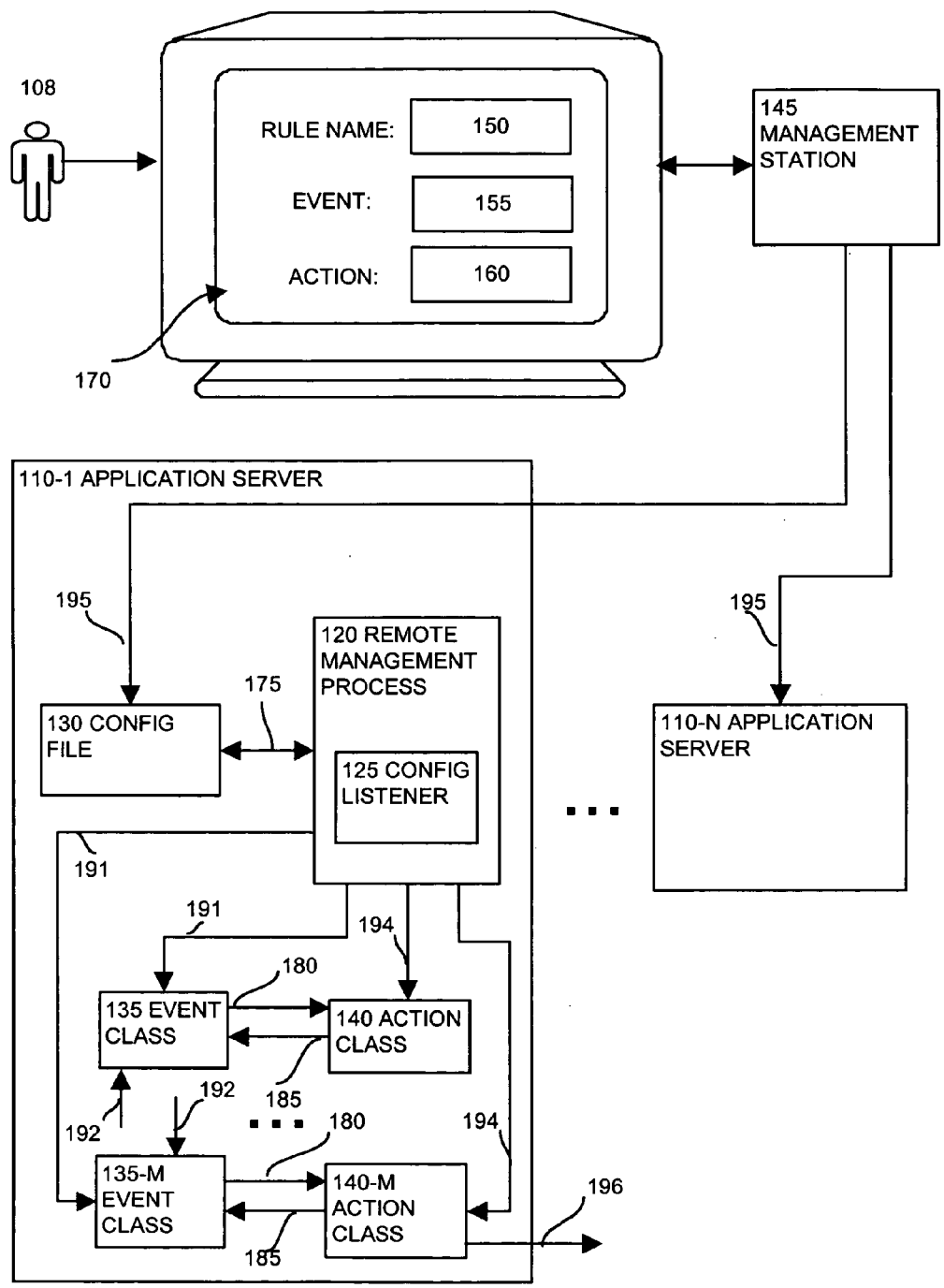
FIG. 1 shows a high-level block diagram of a computer system according to one embodiment disclosed herein.

FIG. 1 is a block diagram illustrating example architecture of a computer system, such as an application server 110 that executes, runs, interprets, operates or otherwise performs a remote management process 120, running a configuration listener 125, suitable for use in explaining example configurations disclosed herein. The application server 110 may be any type of computerized device such as a personal computer, workstation, portable computing device, console, laptop, network terminal or the like. As shown in this example, the application server 110 includes a configuration file 130. A configuration listener 125 detects 175 a change in the configuration file 130, causing the remote management process 120 to instantiate 191 an event class 135 and instantiate 194 an action class 140, based on the changes detected within the configuration file 130. The action class, in turn, registers 185, via a proxy, with the event class 135. An event 192 on the application server 110 causes the events class 135 to send an event notification 180 to the action class 140 to perform an action 196.

The remote management process 120 receives a management configuration set 195 from a management station 145. The management configuration set 195 consists of at least one rule name 150, an event identifier 155 associated with the rule name, and at least one action identifier 160 per event identifier 155, the action 196 to be performed upon detection of the event 192. The management configuration set 195 is specified by a user 108, via a graphical user interface 170, working interactively with the management station 145. The management station 145 disseminates the management configuration set 195 to the application server 110-N by populating the configuration file 130 with the management configuration set 195. The configuration listener 125 within the remote management process 120 on the application server 110 detects the change in the configuration file 130, and instantiates 191 the event class 135, and instantiates 194 the action class.

The remote management process 120 may be embodied as software code such as data and/or logic instructions (e.g., code stored in the memory or on another computer readable medium such as a removable disk) that supports processing functionality according to different embodiments described herein.

The remote management process 120 may be stored on a computer readable medium (such as a floppy disk), hard disk, electronic, magnetic, and optical or other computer readable medium. The remote management process 120 may also be stored in a memory system such as in firmware, read only memory (ROM), or, as in this example, as executable code in, for example, Random Access Memory (RAM). Those skilled in the art will understand that the application server 110 may include other processes and/or software and hardware components, such as an operating system not shown in this example.

Figure 2:
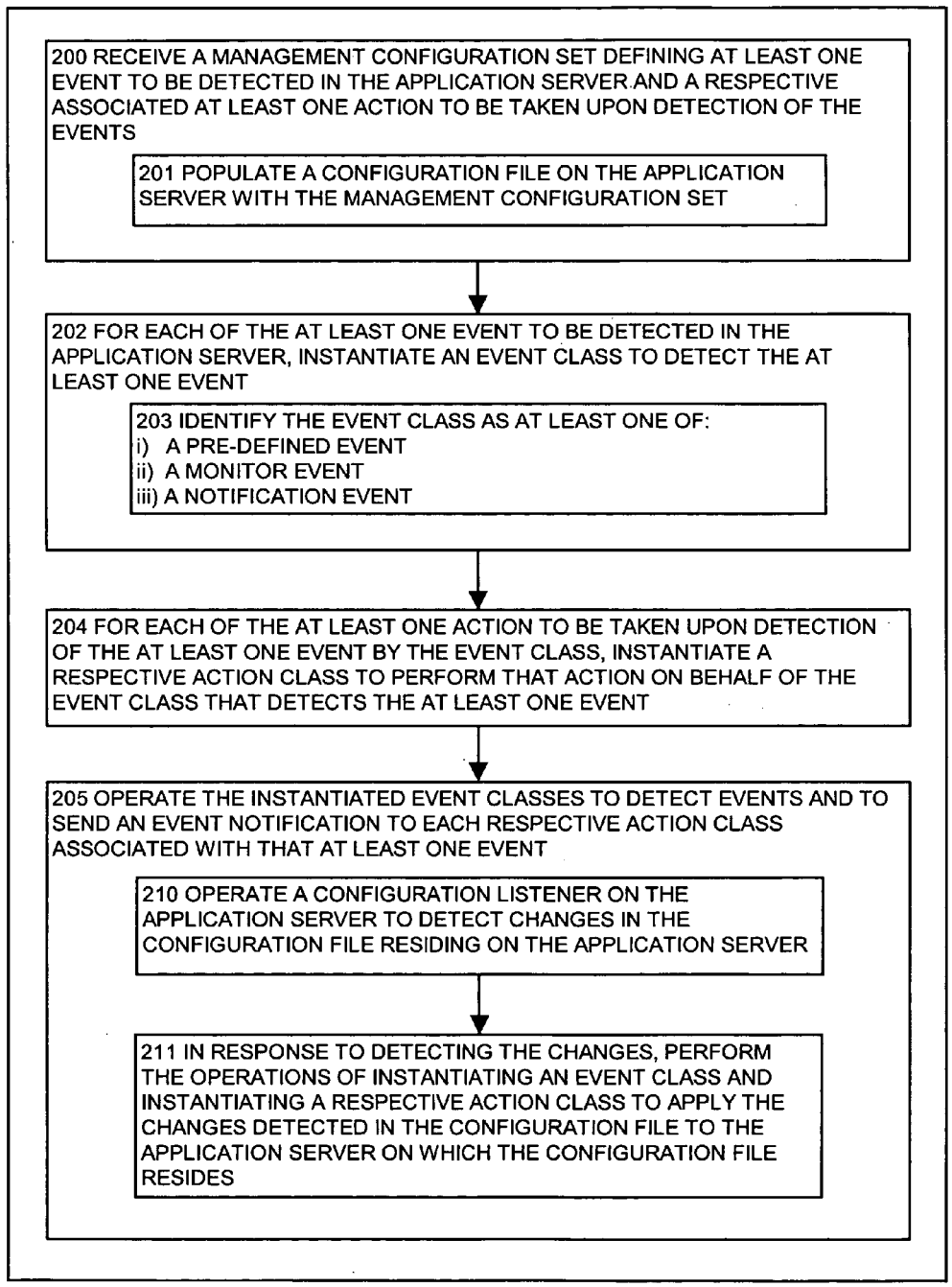
FIG. 2 illustrates a flowchart of a procedure performed by the system of FIG. 1 when the remote management process receives a management configuration set defining at least one event to be detected in the application server and a respective associated action to be taken upon detection of the events, according to one embodiment disclosed herein.

FIG. 2 is a flowchart of the steps performed by the remote management process 120 when it receives a management configuration set 195 defining at least one event 192 to be detected in the application server 110. A respective action 196 associated with the event 192 is to be performed upon detection of the event 192.

In step 200, the remote management process 120 receives a management configuration set 195 defining at least one event 192 to be detected in the application server 110, and a respective associated action 196 to be taken upon detection of the event 192. The remote management process 120 can receive multiple management configuration sets 195. Each management configuration set 195, or rule, is comprised of an event 192 to be detected, and at least one action 196 to be performed upon detection of the event 192.

In step 201, the remote management process 120 populates a configuration file 130 on the application server 110 with the management configuration set 195. The configuration file 130 could be, for example, an Extensible Markup Language (XML) file containing HyperText Markup Language (HTML) tags defining the events 192 to be detected, and the actions 196 to be performed upon detection of the events 192.

In step 202, for each of the events 192 to be detected on the application server 110, the remote management process 120 instantiates an event class 135 to detect the event 192. Once the remote management process 120 detects that the configuration file 130 has been populated with one or more management configuration sets 195, the remote management process 120 instantiates an event class 135 for each of the events 192 specified within the management configuration set(s) 195.

In step 203, the remote management process 120 identifies the event class 135 as at least one of a pre-defined event, a monitor event or a notification event. Details of each type of event are listed below.

Example pre-defined events include Lifecycle events, Group Messaging System (GMS) Events, Logger Events, Trace Events and Timer Events. Lifecycle events could include, but are not limited to "ready", "shutdown" or "termination". GMS Events could include, but are not limited to "start", "stop" or "fail". Logger Events operate by providing a log record, and other useful data to the action 196 when a log event triggers that action 196. When a trace event triggers an action 196, request id, component name and other useful data is provided to the action 196 associated with the Trace Event. Timer events specify a timestamp, indicating the date and time the associated action 196 should be performed.

Monitor Events provide the capability to monitor attributes, for example, statistics related to the application server 110. A Monitor Event can specify an object to monitor, or an attribute of an object to monitor, a monitor type, granularity at which the monitoring data should be collected, and/or a threshold (i.e. a low threshold and/or a high threshold).

Notification Events are simply a generic notification mechanism. Any object that can emit a notification can be a Notification Event.

In step 204, the remote management process 120, for each action 196 to be taken upon detection of the event 192 by the event class 135, instantiates a respective action class 140 to perform that action 196 on behalf of the event class 135 that detects the event 192. The management configuration set 195 provides the remote management process 120 with both the event 192 to be detected, as well as the action 196 to be performed upon detection of the event 192. Once the remote management process 120 has instantiated the event class 135, the remote management process 120 instantiates an action class 140 for each action 196 to be performed when an event 192 is detected on the application server 110. When the action class 140 has been instantiated, the action class 140 registers itself 185, via a proxy, with the associated event class 135 to notify the event class 135 that the action class 140 is ready to perform the associated action 196 upon detection of the event 192 associate with the events class 135.

In step 205, the remote management process 120 operates the instantiated event classes 135-M to detect events 192, and to send an event notification 180 to each respective action class 140 associated with that event 192. Once the event classes 135-M, and the associated action classes 140-M have been instantiated, and the action classes 140-M have registered 185 themselves, via a proxy, with their associated event class 135-M, the remote management process 120 operates the event classes 135-M to detect events 192, and send event notifications 180 to the action classes 140-M associated with the event class 135-M that sent the event notification 180 (i.e. the event class 135-M associated with the action class 140-M receiving the event notification 180).

In step 210, the remote management process 120 operates a configuration listener 125 on the application server 110 to detect 175 changes in the configuration file 130 residing on the application server 110. When the management station 145 populates the configuration file 130 with the management configuration set 195, the configuration listener 125 detects those changes.

In step 211, the remote management process 120, in response to detecting the changes, performs the operations of instantiating an event class 135, and instantiating a respective action class 140 to apply the changes detected 175 in the configuration file 130 to the application server 110 on which the configuration file 130 resides. When the configuration listener 125 detects 175 changes in the configuration file 130, those changes being the receipt of a management configuration set 195, the remote management process 120 instantiates the event classes 135-M, and action classes 140-M associated with the management configuration set 195 received via the configuration file 130.

Figure 3:
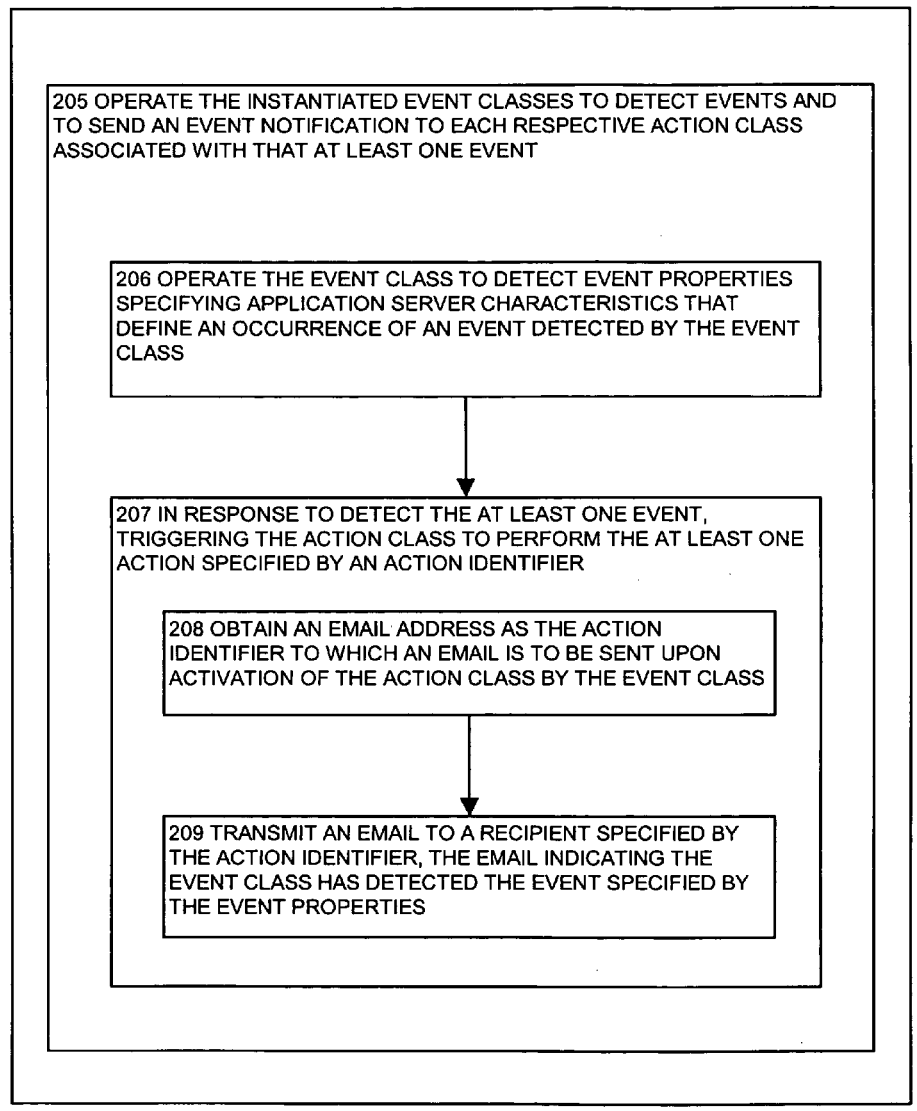
FIG. 3 illustrates a flowchart of a procedure performed by the system of FIG. 1 when the remote management process operates the instantiated event classes to detect events and to send an event notification to each respective action class associated with that event, according to one embodiment disclosed herein.

FIG. 3 is a flowchart of the steps performed by the remote management process 120 when it operates the instantiated event classes 135-M to detect events 192 and to send an event notification 180 to each respective action class 140 associated with that event 192. When events 192 are detected, the event classes 135-M send event notifications 180 to their respective action classes 140-M to perform the action 196 specified by the management configuration set 195 associated with that event 192.

In step 206, the remote management process 120 operates the event class 135 to detect event 192 properties specifying application server 110 characteristics that define an occurrence of an event 190 detected by the event class 135. For example, a Trace Event could detect, but are not limited to, the following events:
    web_component_method_entry
    web_component_method_exit
    webservice_method_entry
    webservice_method_exit
    ejb_component_method_entry
    ejb_component_method_exit
    transaction_start
    transaction_commit
    transaction_rollback
    jdbc_get_connection
    jbc_close_connection
    connector_get_connection
    connector_close_connection.

In step 207, the remote management process 120, in response to detecting the event 192, triggers the action class 140 to perform the action 196 specified by an action identifier 160. For example if the action 196 to be performed was to send an email upon detection of an event 192, the action identifier 160 might be an email address or list of email addresses of recipients who should be notified upon detection of that event 192.

In one embodiment, in step 208, the remote management process 120 obtains an email address as the action identifier 160 to which an email is to be sent upon activation of the action class 140 by the event class 135. When a user 108 specifies a management configuration set 195 that sends an email upon detection of an event 192, the user 108 specifies the properties of the event 192, by specifying an event identifier 155. An action identifier 160 specifies the properties of the action 196. In this case, the action identifier 160 is the email addresses of those recipients who should be notified of the event 192.

In step 209, the remote management process 120 transmits an email to the recipient(s) specified by the action identifier 160. The email indicates the event class 135 has detected the event 192 specified by the event properties in the management configuration set 195.

Figure 4:
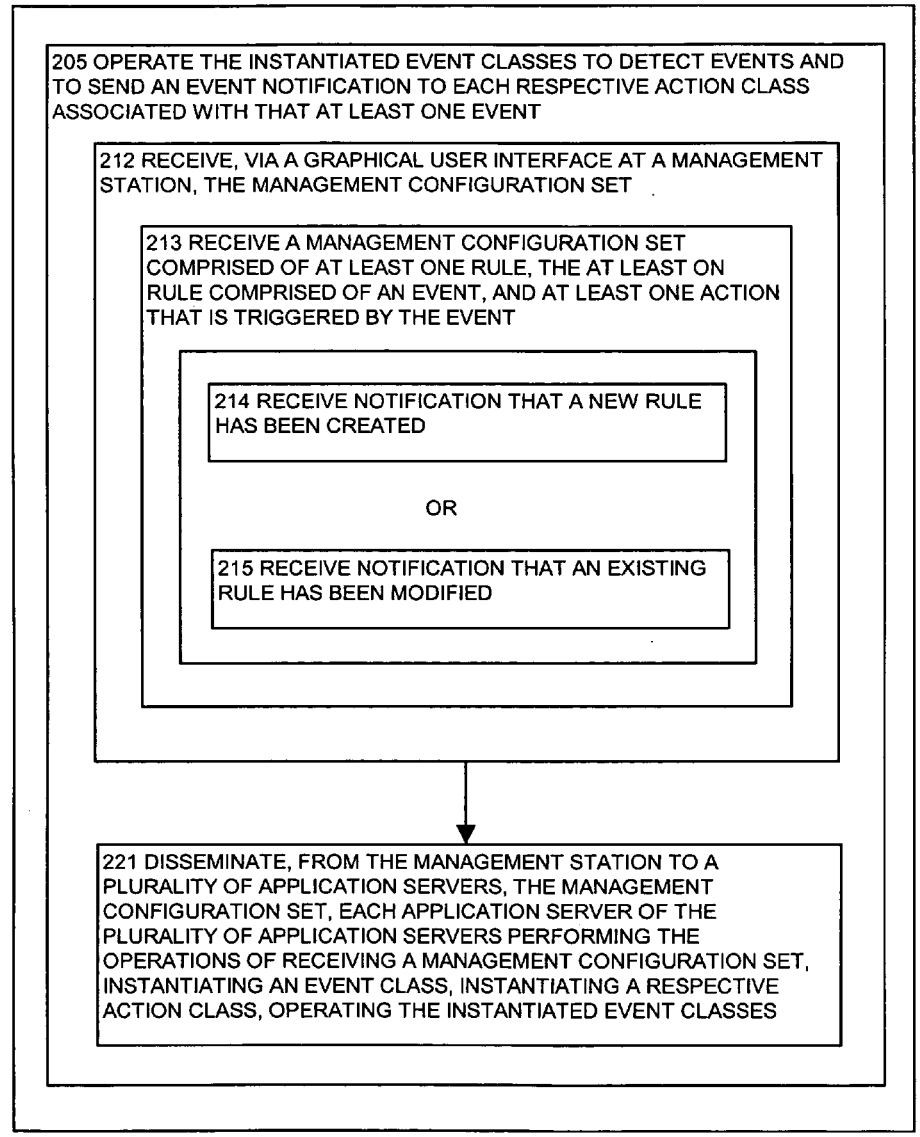
FIG. 4 illustrates a flowchart of a procedure performed by the system of FIG. 1 when the remote management process operates the instantiated event classes to detect events and to send an event notification to each respective action class associated with that event, according to one embodiment disclosed herein.

FIG. 4 is a flowchart of the steps performed by the remote management process 120 when it receives, via a graphical user interface 170 at a management station 145, the management configuration set 195. The management configuration set 195 received at the management station 145 is disseminated to the application servers 110-N.

In step 212, the remote management process 120 receives, via a graphical user interface 170 at a management station 145, the management configuration set 195. A user 108, operating the graphical user interface 170 at the management station 145, specifies the management configuration set 195. In one embodiment, the user 108 can choose which application servers 110-N should receive the management configuration set 195. For example, the infrastructure of the application servers 110-N can be deployed in various topologies. In one embodiment, referred to as One Touch Provisioning, a user 108 can select a preset topology to determine which application servers 110-N receive the management configuration set 195.

In step 213, the remote management process 120 receives a management configuration set 195 comprised of at least one rule, the rule comprised of an event 192, and at least one action 196 that is triggered by the event 192. The rule that can also be referred to as a management rule encapsulates self-management intelligence. A rule contains an action 196 to be taken, when a particular event 192 occurs. In one embodiment, a standard set of rules is available for a user 108 to customize. In one embodiment, a user 108 can create new rules. In one embodiment, more than one rule can be created for the same event 192.

In step 214, the remote management process 120 receives notification that a new rule has been created. A user 108 creates a rule (i.e. a management configuration set 195) via the graphical user interface 170 at the management station 145, via an interactive panel. The user 108 defines the rule name 150, and then chooses the event 192 that causes the rule (i.e. the management configuration set 195) to be invoked by choosing from a drop down list of event types. Depending on the event type chosen, a list of event properties is displayed for the chosen event 192. The user 108 chooses the action 196 to be performed once the rule is invoked.

In step 215, the remote management process 120 receives notification that an existing rule has been modified. For example, an existing rule (i.e. a management configuration set 195) might specify an email to be sent to a first system administrator upon detection of an event 192. A user 108, via the graphical user interface 170 at the management station 145, might modify that rule to change the email address of a first system administrator, to a second system administrator, or perhaps, include the emails of both the first system administrator, and the second system administrator to be notified upon detection of the event 192.

In step 221, the remote management process 120 disseminates, from the management station 145 to a plurality of application servers 110-N, the management configuration set 195. Each application server 110 of the plurality of application servers 110-N performs the operations of receiving a management configuration set 195, instantiating an event class 135, instantiating a respective action class 140, and operating the instantiated event classes. The remote management process 120 populates the configuration file 130 with the management configuration set 195 disseminated by the management station 145. The configuration listener 125 detects 175 the change(s) in the configuration file 130 causing the remote management process 120 to instantiate the event classes 135-M, and associated action classes 140-M associated with the management configuration set 195.

Figure 5:
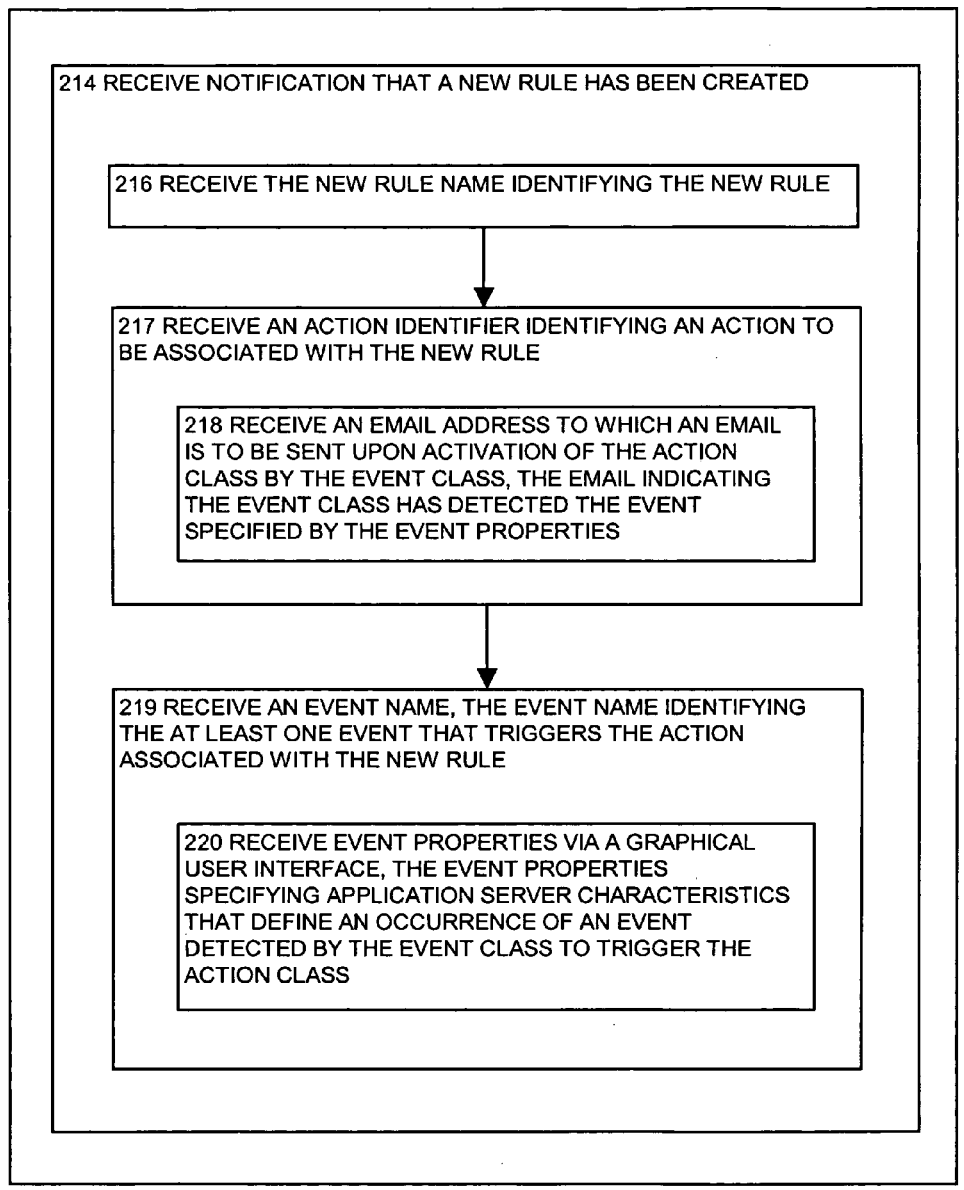
FIG. 5 illustrates a flowchart of a procedure performed by the system of FIG. 1 when the remote management process receives notification that a new rule has been created, according to one embodiment disclosed herein.

FIG. 5 is a flowchart of the steps performed by the remote management process 120 when it receives the new rule name 150, identifying the new rule. A rule, such as a management rule encapsulates self-management intelligence. A rule contains an action 196 to be taken, when a particular event 192 occurs. In one embodiment, a user 108 can define a new rule.

In step 216, the remote management process 120 receives the new rule name 150 identifying the new rule. A user 108 interacting with the graphical user interface 170 at the management station 145 specifies the new rule name 150.

In step 217, the remote management process 120 receives an action identifier 160 identifying an action 196 to be associated with the new rule. The user 108 specifies the action 196 to be taken when the remote management process 120 has detected an event 192.

In step 219, the remote management process 120 receives an event identifier 155, the event identifier 155 identifying the at least one event 192 that triggers the action 196 associated with the new rule. The user 108 specifies the event 192 to be detected. Depending on the event type chosen, the user 108 may also specify event properties for the event 192. Some of the event properties may be multiple-choice options, while others might be data fields that need to be filled in by the user 108, with the correct value for that field. For example, a user 108 might have to enter the email address of a recipient who is to receive an email notification upon detection of an event 192.

In step 218, the remote management process 120 receives an email address to which an email is to be sent upon activation of the action class 140 by the event class 135, the email indicating the event class 135 has detected the event 192 specified by the event properties.

In step 220, the remote management process 120 receives event properties via a graphical user interface 170, the event properties specifying application server 110 characteristics that define an occurrence of an event 192 detected by the event class 135 to trigger the action class 140.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method for remote management of one or more application servers, the method comprising:
   executing a remote management process on each of the one or more application servers;
   receiving an administrator-definable management configuration set, sent from an administrator to each of the remote management processes on each of the one or more application servers, defining at least one event to be detected in the application server and a respective associated at least one action to be taken upon detection of the events;
   for each of the at least one event to be detected in the application server, instantiating, via the remote management process, an event class on the application server to detect the at least one event;
   for each of the at least one action to be taken upon detection of the at least one event by the event class, instantiating, via the remote management process, a respective action class on the application server to perform that action on behalf of the event class that detects the at least one event; and
   operating the instantiated event classes to detect events and to send an event notification to each respective action class associated with that at least one event.

2. The method of claim 1 wherein receiving an administrator-definable management configuration set comprises:
   populating a configuration file on the application server with the management configuration set; and wherein the method comprises:
   operating a configuration listener on the application server to detect changes in the configuration file residing on the application server; and in response to detecting the changes, performing the operations of instantiating an event class and instantiating a respective action class to apply the changes detected in the configuration file to the application server on which the configuration file resides.

3. The method of claim 2 wherein operating the instantiated event classes comprises:
   operating the event class to detect event properties specifying application server characteristics that define an occurrence of an event detected by the event class; and
   in response to detecting the at least one event, triggering the action class to perform the at least one action specified by an action identifier.

4. The method claim 3 wherein triggering the action class to perform the at least one action specified by an action identifier comprises:
   obtaining an email address as the action identifier to which an email is to be sent upon activation of the action class by the event class; and transmitting an email to a recipient specified by the action identifier, the email indicating the event class has detected the event specified by the event properties.

5. The method of claim 1 wherein instantiating an event class to detect the event comprises:
identifying the event class as at least one of:
i) a pre-defined event;
ii) a monitor event; and
iii) a notification event.

6. The method of claim 1 comprising:
receiving from the administrator, via a graphical user interface at a management station, the administrator-definable management configuration set; and
disseminating, from the management station to a plurality of application servers, the administrator-definable management configuration set, each application server of the plurality of application servers performing the operations of receiving an administrator-definable management configuration set, instantiating an event class, instantiating a respective action class, operating the instantiated event classes.

7. The method of claim 6 wherein receiving an administrator-definable management configuration set comprises:
receiving a management configuration set comprised of at least one rule, the at least on rule comprised of an event, and at least one action that is triggered by the event.

8. The method of claim 7 wherein receiving an administrator-definable management configuration set comprised of at least one rule comprises:
receiving notification that a new rule has been created.

9. The method of claim 7 wherein receiving an administrator-definable management configuration set comprised of at least one rule comprises:
receiving notification that an existing rule has been modified.

10. The method of claim 8 wherein receiving notification that a new rule has been created comprises:
receiving the new rule name identifying the new rule;
receiving an action identifier identifying an action to be associated with the new rule; and receiving an event name, the event name identifying the at least one event that triggers the action associated with the new rule.

11. The method claim 10 wherein receiving the action identifier comprises:
receiving an email address to which an email is to be sent upon activation of the action class by the event class, the email indicating the event class has detected the event specified by the event properties.

12. The method of claim 10 wherein receiving an event name comprises:
receiving event properties input via a graphical user interface, the event properties specifying application server characteristics that define an occurrence of an event detected by the event class to trigger the action class.

13. A computerized device comprising:
a memory;
a processor;
a communications interface;
an interconnection mechanism coupling the memory, the processor and the communications interface;
where the memory is encoded with a remote management application that when executed on the processor remotely manages the computerized device by performing the operations of:
receiving a user-definable management configuration set defining at least one event to be detected in the application server and a respective associated at least one action to be taken upon detection of the at least one event;
for each of the at least one event to be detected in the application server, instantiating an event class to detect the at least one event;
for each of the at least one action to be taken upon detection of the at least one event by the event class, instantiating a respective action class to perform that action on behalf of the event class that detects the at least one event; and
operating the instantiated event classes to detect events and to send an event notification to each respective action class associated with that at least one event.

14. The computerized device of claim 13 wherein when the computerized device performs the operation of receiving a user-definable management configuration set, the computerized device performs the operation of:
populating a configuration file on the application server with the management configuration set; and
wherein the computerized device performs the operations of:
operating a configuration listener on the application server to detect changes in the configuration file residing on the application server; and in response to detecting the changes, performing the operations of instantiating an event class and instantiating a respective action class to apply the changes detected in the configuration file to the application server on which the configuration file resides.

15. The computerized device of claim 14 wherein when the computerized device performs the operation of operating the instantiated event classes, the computerized device performs the operations of:
operating the event class to detect event properties specifying application server characteristics that define an occurrence of an event detected by the event class; and in response to detecting the at least one event, triggering the action class to perform the at least one action specified by an action identifier.

16. The computerized device claim 15 wherein when the computerized device performs the operation of triggering the action class to perform the at least one action specified by an action identifier, the computerized device performs the operations of:
obtaining an email address as the action identifier to which an email is to be sent upon activation of the action class by the event class; and transmitting an email to a recipient specified by the action identifier, the email indicating the event class has detected the event specified by the event properties.

17. The computerized device of claim 13 wherein the computerized device performs the operations of:
receiving, via a graphical user interface at a management station, the user-definable management configuration set; and disseminating the user-definable management configuration set, from the management station to a plurality of application servers, each application server of the plurality of application servers performing the operations of receiving a user-definable management configuration set, instantiating an event class, instantiating a respective action class, operating the instantiated event classes.

18. A computerized device comprising:
a memory;
a processor;
a communications interface;
an interconnection mechanism coupling the memory, the processor and the communications interface;
where the memory is encoded with a remote management application that when executed on the processor configures the computerized device with a means for remotely managing an application server, the means including:

means for receiving a management configuration set defining at least one event to be detected in the application server and a respective associated at least one action to be taken upon detection of the events;

for each of the at least one event to be detected in the application server, means for instantiating an event class to detect the at least one event;

for each of the at least one action to be taken upon detection of the at least one event by the event class, means for instantiating a respective action class to perform that action on behalf of the event class that detects the at least one event; and means for operating the instantiated event classes to detect events and to send an event notification to each respective action class associated with that at least one event.

19. A non-transitory computer readable medium encoded with compute programming logic that when executed on a process in a computerized device produces a process that remotely manages an application server by causing the computerized device to perform the operations of:

receiving a management configuration set defining at least one event to be detected in the application server and a dynamically redefinable respective associated at least one action to be taken upon detection of the events;

for each of the at least one event to be detected in the application server, instantiating an event class to detect the at least one event;

for each of the at least one action to be taken upon detection of the at least one event by the event class, instantiating a respective action class to perform that action on behalf of the event class that detects the at least one event; and operating the instantiated event classes to detect events and to send an event notification to each respective action class associated with that at least one event.

* * * * *